Patented Oct. 6, 1936

2,056,454

UNITED STATES PATENT OFFICE 2,056,454

MOLDING POWDERS AND METHOD OF MOLDING THEM

Arthur M. Howald, Pittsburgh, Pa., assignor, by mesne assignments, to Plaskon Company, Incorporated, a corporation of Delaware No Drawing. Application September 26, 1930, Serial No. 484,719

37 Claims. (Cl. 18—55)

This invention relates to improvements in molding powders; and it comprises a molding powder adapted to produce glass-like molded products under heat and pressure and processes of producing such a molding powder wherein urea is condensed with formaldehyde in aqueous solution at ordinary temperatures, the reaction being allowed to go forward quietly and the water of the solution being thereafter removed, the condensation product being reduced to a dry powder, various adjuncts such as pigments, fillers, fixers, plasticizers, etc., being usually incorporated therewith prior or subsequent to drying; and it also comprises a molding powder containing such a low temperature condensation of formaldehyde and urea in a dry state; all as more fully hereinafter set forth and as claimed.

Urea and formaldehyde are capable of undergoing reactions by which, in the end, glass-like articles of desirable quality can be obtained. The usual theory of the art is that to accomplish this result it is necessary to cause the urea and the formaldehyde to undergo a violent reaction of some kind at a temperature of 100° C. or higher. In the usual procedure, urea and formaldehyde in aqueous solution are heated to 100° C., or thereabout, generally under a reflux condenser to maintain constant volume and prevent loss of aldehyde. At the reaction temperature, internally developed heat is generally sufficient to maintain the mixture boiling for a half hour or more, using the ordinary 40 per cent formaldehyde solution and dry urea. Heat from an outside source is not necessary except in starting. When the reaction is complete, it is the general practice to cast the syrupy product into a pan mold and then dry, shrink and condense the liquid by prolonged baking. In this baking much of the formaldehyde disappears and the quality of the baked material is more or less dependent upon this loss. In a completely satisfactory baked slab, the optical and other properties are much like those of glass with the important further advantage that the material can be machined and otherwise worked with tools to form a final article.

In the prior art this high temperature and violent action have always been considered necessary. Even reaction products made in the cold are subjected to a boiling or baking or both, prior to forming final products.

While samples of highly desirable articles made in the recited manner have appeared, large scale commercial production has not yet become possible.

I have found that this supposed necessity for an intermediate heat treatment is not actual and that quiet reaction of the reagents in aqueous solution in the cold suffices to give me a product which upon careful drying and grinding affords a product that can be used as a molding powder; that is can be set into final glass-like products under heat and pressure. In drying I avoid high temperatures which might cause violent reaction and prefer to effect drying at a temperature not above 65° C.

In a specific embodiment of my process using ordinary dry urea and a commercial 35–40 per cent solution of formaldehyde, the reaction is carried out at ordinary temperatures, the solution of formaldehyde at first cooling on addition of the urea and later warming very slightly. Approximately 2 moles, or slightly above, of the formaldehyde are used to 1 mole of the urea. If the reacting mixture is kept approximately neutral it is desirable to allow as long as 24 hours for the reaction to take place, while if the solution is slightly acidified this time may be reduced to a few hours. In either case it is desirable to bring the solution to a slightly acid reaction (say a pH of 6) before proceeding to evaporate or dry the product.

In case a filler is used, such as wood flour, asbestos, sulfite pulp or the like, it is desirable to incorporate this into the solution before drying. Drying may then be accomplished by use of one of the ordinary dryers such as a shelf drier, or a rotary kiln drier. Heating is not required in the drying operation to produce the desired product, but is convenient to increase the rapidity of the drying operation. Air drying at 65° C. may be employed.

If no filler is employed, drying is somewhat more difficult since the solution, upon evaporation, has a tendency to become tacky. It can be spray-dried.

If a filler is used, no plasticizer is ordinarily required but otherwise I advantageously intermix a resin such as a phenol-aldehyde or meta-toluene-sulfon-amid resin. I have found that resins of the glyptal type such as glycerol-phthalic acid resins are the most desirable for use in this connection. The resin may be intermixed before or after drying. I advantageously incorporate an acid with the resin, either the same acid which is used in forming the resin or an organic acid such as tartaric, oxalic or salicylic. This acid should be soluble in the resin. It should be a solid at ordinary temperatures while melting at molding temperatures. In this case the acid becomes effective only during the final molding operation. The use of solid solutions of an acid in a solid, non-volatile plasticizer, per se, is set forth and claimed in my copending application Serial No. 363,412. Sufficient acid should be added to cause a distinctly acid reaction at this time. The proportion of resin used varies with the properties desired in the final product. I may add even as much as 75 per cent of the total weight of the product.
After the above product is dried, either with or without a filler, it is advantageously mixed with a formaldehyde extracting and fixing agent and ground to a powder. For this purpose I use urea, thiourea, resorcinol or other agent which will condense or combine with some of the aldehyde employed in making the initial material. The amount of extracting and fixing agent used is such that the final molecular ratio of the aldehyde to the sum of the extracting and fixing agent and the urea used in this process, varies approximately from 1.5:1 to 1.75:1.

The extracting agent may be added before or after the grinding of the dried product or just prior to the drying operation. If added before drying, the latter operation must be completed before the extracting agent has had opportunity to react with the formaldehyde from the initial product. When a rotary drier is used it is convenient to add the fillers, pigments, extracting agents, plasticizers, etc., before drying, in order that thorough mixing may be obtained in the dryer. The grinding stage of the process is another convenient point at which to add these adjuncts. The mixture of the initial condensation product with the fillers, pigments, extracting and fixing agents, plasticizers, etc., however added, dried and finally ground, constitutes the molding powder of my invention.

The final step in my process is molding. The above molding powder is placed in a mold, heated to the neighborhood of 140° C. and a pressure of about 2000 pounds per square inch is applied. The resulting product is a hard, non-brittle, non-porous, heat and light resistant solid which can be made transparent and water white, opaque and porcelain like or delicately tinted according to variations of my process within the scope of my invention. In the manufacture of special sheets and laminated materials it is sometimes desirable to impregnate wood board, paper, textile products and the like with a solution of the primary condensation product of my invention, and, after drying, to harden the same under heat and pressure. The impregnated and dried material may be disintegrated to a powder before molding.

What I claim is:

1. In the manufacture of pressure-shaped, heat-hardened articles from molding compositions containing urea-formaldehyde condensation products, the improved process which comprises hot-pressing a dry molding composition containing a low-temperature, initial, urea-formaldehyde condensation product and a fixing agent, said condensation product being one formed at temperatures not exceeding 65° C. and being fusible and capable of heat-hardening at molding temperatures and said fixing agent being capable of combining with and fixing the formaldehyde liberated during said molding, thereby flowing, shaping and setting said composition to form said molded articles and fixing the liberated formaldehyde to stabilize the molded article.

2. An improved molding composition containing urea-formaldehyde condensation products, suitable for making molded articles by hot-pressing, said composition being dry and substantially free of uncombined volatile bodies and comprising a low-temperature, initial, urea-formaldehyde condensation product and a fixing agent, said condensation product being one formed at temperatures not exceeding 65° C. and being fusible and capable of heat-hardening at molding temperature and said fixing agent being capable of combining with and fixing formaldehyde liberated during said molding.

3. The product of claim 2, in which said fixing agent is a urea.

4. The product of claim 2, in which said fixing agent is thiourea.

5. The product of claim 2, in which said fixing agent is urea.

6. In the manufacture of pressure-shaped, heat-hardened articles from molding compositions containing urea-formaldehyde condensation products, the preparation of an improved molding composition containing said condensation products and other components, which comprise forming an initial condensation product in aqueous solution at ordinary temperatures and arresting reaction at that stage, and adding the other components at any time subsequent to the formation of said initial condensation product and prior to hot-molding, reactive components being added in such manner and under such conditions as to prevent said reactive components from reacting with and advancing the condensation of said initial reaction product, the mixture of components being dried and freed of uncombined volatiles before hot molding and the components being so adjusted as to compensate for and fix any volatiles liberated during hot molding, said molding composition being capable, at molding temperatures, of flowing under molding pressures to assume the desired shape and then heat-setting at said molding temperatures.

7. The process of claim 6, wherein a reactive compound is used as an added component, said reactive component being a fixing agent capable of combining with and fixing formaldehyde.

8. In the manufacture of synthetic resins, the process which comprises condensing together at ordinary temperatures urea and formaldehyde in aqueous solution, completely removing the water at a relatively low temperature, and grinding; adding a fixing agent capable of combining with and fixing formaldehyde, at any step after the initial condensation in such a manner and under such conditions as to prevent the fixing agent from combining with the formaldehyde present in the composition prior to molding under heat and pressure.

9. In the manufacture of molded articles under heat and pressure by processes involving the preparation of a molding powder, the steps which comprise reacting 1 mol. of urea with 2 mols of formaldehyde at ordinary temperatures in an aqueous solution having a pH value between 6 and 7, after the initial reaction is complete adjusting the pH value of the solution thus obtained to about 6, then, just prior to drying, mixing the slightly acid solution of the condensation product with a substance capable of extracting and fixing formaldehyde and immediately drying the mixture under such conditions that the added substance does not react with the formaldehyde present, thus forming a substantially dry mixture which is free from water and other volatiles and arresting the reaction.

10. The process of claim 6, wherein said other components are added prior to arresting the reaction.

11. In the manufacture of synthetic resins, the process which comprises condensing together at ordinary temperatures urea and formaldehyde in aqueous solution, mixing a filler and a fixing agent capable of combining with and fixing formaldehyde with the aqueous solution of the primary condensation product thus obtained, drying the mixture at a relatively low temperature to remove the water and other volatiles and then grinding the dry mixture to a powder.

12. In the manufacture of molded articles under heat and pressure by processes involving the preparation of a molding powder, the steps which comprise reacting about 1 mol of urea with 2 mols of formaldehyde at ordinary temperature in an aqueous solution having a pH between 6 and 7, after forming the primary condensation product adjusting the solution thus obtained to a pH value of about 6, mixing the slightly acid solution so produced with a fibrous filler, and then air drying at about 60° C. the moist mass so obtained.

13. The improved process of claim 6, wherein the reaction solution is converted into a moist mass having a large superficial drying area and the moist mass then air-dried.

14. In the manufacture of molded articles under heat and pressure by processes involving the preparation of a molding powder, the steps which comprise impregnating a sheet-like fibrous material with an aqueous solution of a primary condensation product of urea and formaldehyde obtained by reacting such substances at ordinary temperature in an aqueous solution, air drying the impregnated sheet at a temperature of about 65° C. and then disintegrating the dried impregnated material to form a powder, the powder obtained being useful in making said molding powders.

15. As a new product, a dry, powdered, molding composition free of water and other volatiles, said molding composition comprising a low temperature primary condensation product of formaldehyde and urea, having formaldehyde combined with urea in the molecular ratio of approximately 2 to 1, a filler and a substance capable of extracting and fixing formaldehyde in molding conditions, said substance being present in amounts sufficient to reduce the overall ratio of formaldehyde to urea and said substance to between 1.5:1 and 1.75:1, said low temperature primary condensation product being one formed at temperatures not exceeding 65° C.

16. The product of claim 15 in which said filler is a fibrous filler.

17. The product of claim 15 in which said filler is wood flour.

18. The product of claim 15 in which said filler is sulfite pulp.

19. The product of claim 15 in which said filler is asbestos.

20. In the manufacture of molded articles under heat and pressure by processes involving the preparation of a molding powder, the steps which comprise mixing a soluble, fusible, condensation product of urea and formaldehyde with a fusible resin containing dissolved therein an organic acid and converting the mixture into a dry powder, without substantial loss of fusibility, the said organic acid being held in the resin in solid solution and thus isolated from the condensation product prior to molding under heat and pressure, said soluble, fusible condensation product being one formed at temperatures not exceeding 65° C.

21. In the manufacture of molded articles from molding powders under heat and pressure, the process of preparing a molding powder which comprises mixing an aqueous solution of an initial condensation product of urea obtained by reacting formaldehyde and urea in the molecular ratio of 2:1 in said aqueous solution at ordinary temperature, with a fibrous filler, a fusible resin containing an organic acid dissolved therein and a urea, said urea being added in sufficient amount to reduce the overall ratio of formaldehyde to urea to between 1.5:1 to 1.75:1, simultaneously drying said mixture at a low temperature and tumbling the same to produce a homogeneous uniform mass, and grinding the mixture thus obtained to a powder, thus producing a substantially dry molding composition free from water and volatiles which contains a fusible condensation product of urea and formaldehyde and an added material.

22. As a new product, a dry, powdered, molding composition free of water and other volatiles, said molding composition comprising a low temperature primary condensation product of formaldehyde and urea, having formaldehyde combined with urea in the molecular ratio of approximately 2 to 1, a nonvolatile plasticizer and a substance capable of extracting and fixing formaldehyde in molding conditions, said substance being present in amounts sufficient to reduce the overall ratio of formaldehyde to urea and said substance to between 1.5:1 and 1.75:1, said low temperature primary condensation product being one formed at temperatures not exceeding 65° C.

23. As a new product, a dry, powdered, molding composition free of water and other volatiles, said molding composition comprising a low temperature primary condensation product of formaldehyde and urea, having formaldehyde combined with urea in the molecular ratio of approximately 2 to 1, a fusible, synthetic resin containing dissolved therein an organic acid held in solid solution in the same, and a substance capable of extracting and fixing formaldehyde under molding conditions, said substance being present in amounts sufficient to reduce the overall ratio of formaldehyde to urea and said substance to between 1.5:1 and 1.75:1, said low temperature primary condensation product being one formed at temperatures not exceeding 65° C.

24. The product of claim 23 in which said fusible resin is a phenol formaldehyde resin.

25. The product of claim 23 in which said fusible resin is a resin of the glyptal type.

26. The product of claim 23 in which said fusible resin is a resin of the meta-toluene-sulfonamid type.

27. The product of claim 23 in which said organic acid is tartaric acid.

28. The product of claim 23 in which said organic acid is oxalic acid.

29. The product of claim 23 in which said organic acid is salicyclic acid.

30. In the manufacture of molded articles from molding powders under heat and pressure, the process of preparing a molding powder which comprises reacting 1 mol. of urea with 2 mols of formaldehyde at ordinary temperature in an aqueous solution, adjusting the pH value of the solution of the initial condensation product thus obtained to about 6, evaporating the slightly acid solution so obtained to dryness at relatively low temperatures to remove all the water and volatiles and to arrest the reaction, mixing the dried condensation product thus obtained with a fusible resin containing dissolved therein an organic acid, the said organic acid being held in the fusible resin in solid solution and thus isolated from the other constituents of the mixture prior to molding under heat and pressure and a urea, the amount of the added urea compound being sufficient to reduce the overall ratio of formaldehyde to urea to between 1.5:1 and 1.75:1, and grinding the dry mixture to a powder, thus producing a dry powdered molding composition free of water and volatiles containing a fusible primary condensation product of urea and formaldehyde and the added materials in intimate uniform admixture.

31. In the manufacture of molded articles under heat and pressure by processes involving the preparation of a molding powder, the steps which comprise reacting about 1 mol. of urea with 2 mols of formaldehyde at ordinary temperatures in a slightly acid aqueous solution having a pH value between 6 and 7, adjusting the pH value of the aqueous solution of the initial reaction product thus obtained to about pH 6 and drying the slightly acid solution so obtained at relatively low temperatures not exceeding 65° C. to form a dry, soluble, fusible, low temperature, acid-condensed, initial condensation product free of water and other uncombined volatiles and to arrest the reaction, said dry fusible product liberating formaldehyde when hot pressed, and mixing the said dry soluble fusible condensation product so obtained with sufficient dry urea to combine with and fix the formaldehyde liberated during hot pressing.

32. In the manufacture of molded articles under heat and pressure, the process which comprises reacting about 1 mol. of urea with 2 mols of formaldehyde in an aqueous solution at ordinary temperatures to form an initial condensation product, evaporating the solution thus obtained to dryness at relatively low temperatures, to remove the water and other volatiles, mixing the dry condensation product thus obtained with a sufficient amount of a substance capable of extracting and fixing formaldehyde to reduce the ratio of formaldehyde to urea in the final molding product to between 1.5:1 to 1.75:1 and then molding the dried mixture thus obtained under heat and pressure.

33. In the manufacture of molded articles under heat and pressure by processes involving the preparation of a molding powder, the steps which comprise reacting about 1 mol. of urea with 2 mols of formaldehyde at ordinary temperatures in an aqueous solution having a pH between 6 and 7, after the initial reaction is complete adjusting the pH value of the solution thus obtained to about 6, evaporating the slightly acid solution so obtained to dryness at relatively low temperatures, thus removing the water and other volatiles and arresting the reaction and mixing the dry condensation product thus obtained with a substance capable of extracting and fixing the urea, the amount of said substance being sufficient to reduce the overall ratio of formaldehyde to urea and the added substance to between 1.5:1 and 1.75:1.

34. In the manufacture of molded articles under heat and pressure by processes involving the preparation of a molding powder, the step which comprises mixing a primary, soluble, fusible condensation product of urea and formaldehyde with a substance capable of extracting and of fixing formaldehyde, said mixing being effected under such conditions that the said substance does not react with the formaldehyde present during such mixing, said soluble, fusible condensation product being one formed at temperatures not exceeding 65° C.

35. As a new product, a dry, fusible molding powder free from volatiles and capable of being molded under heat and pressure to give hardened, shaped, infusible, stable, molded articles in which the final overall molecular ratio of formaldehyde to substances combined with formaldehyde is between 1.5:1 and 1.75:1, said powder comprising a dry, fusible condensation product of urea and formaldehyde obtained by reacting approximately 2 mols of formaldehyde with 1 mol. of urea in aqueous solution at ordinary temperatures and evaporating said solution to dryness at relatively low temperatures, and a sufficient amount of a fixing agent capable of extracting and fixing formaldehyde during molding, to reduce such overall ratio to the desired value.

36. An improved plastic composition suitable for making pressure-shaped, heat-hardened molded articles, said composition being dry and free of uncombined volatiles and comprising a fibrous filler impregnated with low temperature, acid condensed primary condensation product of formaldehyde and urea, and a fixing agent admixed therewith, said fixing agent being capable of combining with and fixing formaldehyde and said primary condensation product having formaldehyde combined with urea in the molar ratio of approximately 2:1 and being one formed at temperatures not exceeding 65° C.

37. In new plastic compositions and molded articles, improved products having a composition comprising the reaction product of formaldehyde and urea, condensed in aqueous solution at ordinary temperatures and in the molecular ratio of approximately 2:1; a fixing agent capable of combining with and fixing formaldehyde and a plasticizer.

ARTHUR M. HOWALD.